United States Patent [19]

Baird

[11] Patent Number: 5,059,105
[45] Date of Patent: Oct. 22, 1991

[54] RESILIENT MOLD ASSEMBLY

[75] Inventor: John Baird, Scottsdale, Ariz.

[73] Assignee: Motorola, Inc., Schaumburg, Ill.

[21] Appl. No.: 425,152

[22] Filed: Oct. 23, 1989

[51] Int. Cl.⁵ .............................................. B29C 39/10
[52] U.S. Cl. ..................... 425/116; 100/211;
100/258 A; 100/295; 264/272.17; 425/121;
425/411; 425/444
[58] Field of Search ........... 264/328.9, 272.17, 272.16,
264/272.11; 425/111, 116, 121, DIG. 44, 443,
444, 411, 414; 100/211, 295, 258 A, 258 R

[56] References Cited

U.S. PATENT DOCUMENTS

| | | | |
|---|---|---|---|
| 3,615,946 | 10/1971 | Palmer | 264/272.17 |
| 3,622,419 | 11/1971 | London et al. | 264/272.11 |
| 3,685,784 | 8/1972 | Spanjer | 425/116 |
| 3,712,575 | 1/1973 | Bement et al. | 264/272.11 |
| 4,044,984 | 8/1977 | Shimizu et al. | 425/116 |
| 4,160,639 | 7/1979 | Umeda | 425/DIG. 44 |
| 4,236,689 | 12/1980 | Hass | 425/DIG. 44 |
| 4,373,259 | 2/1983 | Motsch | 29/840 |
| 4,480,975 | 11/1984 | Plummer et al. | 425/111 |
| 4,555,086 | 11/1985 | Kiyotomo | 425/116 |
| 4,612,081 | 9/1986 | Kasper et al. | 425/407 |
| 4,615,857 | 10/1986 | Baird | 425/116 |
| 4,701,117 | 10/1987 | Takaoka et al. | 425/116 |
| 4,723,899 | 2/1988 | Osada | 425/116 |
| 4,738,813 | 4/1988 | Finkensiep | 425/DIG. 44 |
| 4,753,160 | 6/1988 | Baird et al. | 100/295 |
| 4,854,599 | 8/1989 | Bartack | 425/116 |

*Primary Examiner*—Jay H. Woo
*Assistant Examiner*—Robert B. Davis
*Attorney, Agent, or Firm*—Joe E. Barbee

[57] ABSTRACT

A resilient sheet of material is used between a cavity plate and a mold base in a system used to encapsulate items such as semiconductor devices. The resilient sheet of material compensates for any dimensional variations in the cavity plates. In addition, compensation is also made for dimensional variations of the item being encapsulated. In one embodiment, the sheet of resilient material is used to seal cavity openings in the cavity plate. A method for the use of such an arrangement is also provided.

6 Claims, 1 Drawing Sheet

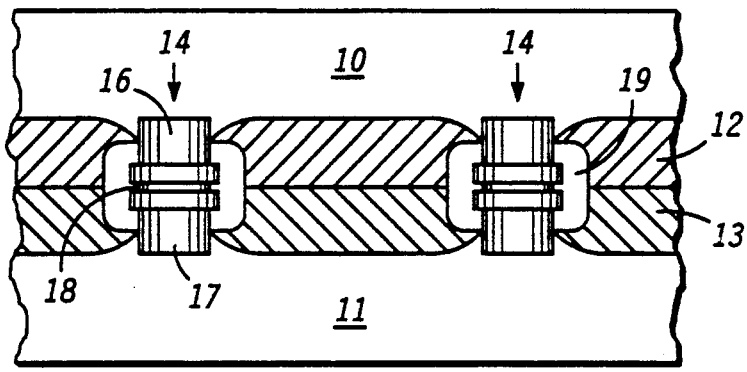
FIG. 1
FIG. 2
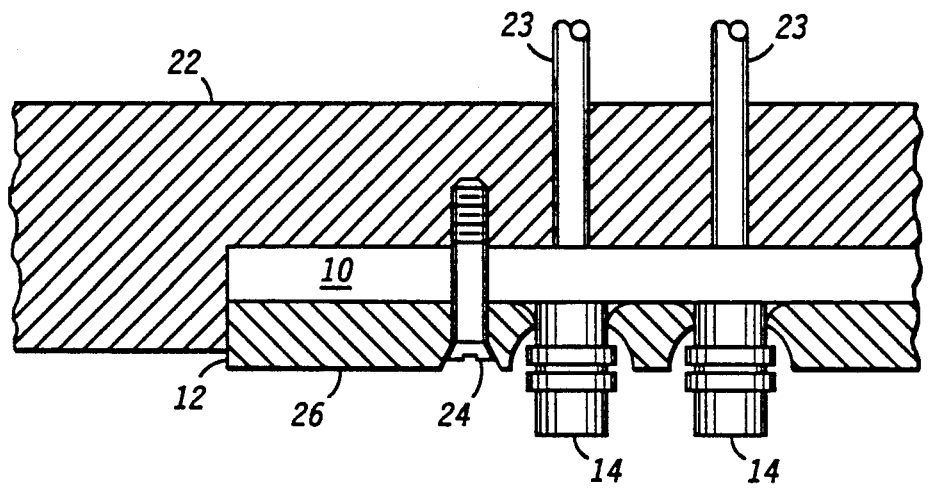
FIG. 3
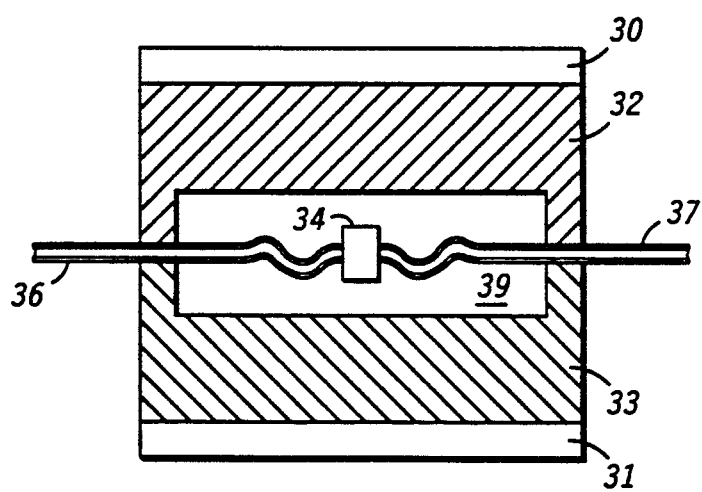

RESILIENT MOLD ASSEMBLY

BACKGROUND OF THE INVENTION

This invention relates, in general, to a mold assembly for encapsulating items, and more particularly, to the use of a resilient material in a mold assembly to compensate for dimensional variations of a cavity plate or the work piece itself.

In the manufacture of components it is often desirable to encapsulate these components with a protective material. This is particularly true of small components or work pieces such as semiconductor devices. In the past, an upper mold half and a lower mold half forming a plurality of cavities there between have been used. The semiconductor device is inserted in the cavity and then encapsulating material is injected into the cavity to encapsulate the semiconductor device. The mold plates are machined to very tight tolerances. However, it is more difficult to maintain the semiconductor devices to the same tight tolerances. This is particularly true for rectifier diodes packaged as button diodes. The mold cavity is machined to have one face-to-face dimension whereas the button diode face-to-face dimension actually varies in height and parallelism also. This will cause excess clearance for some products and interference fit with others resulting in product damage. A mold cavity having excess clearance will result in a thin layer of the encapsulating material being forced into the opening caused by the excess clearance resulting in what is commonly called flash. This flash was then removed in a subsequent operation which increased the cost of manufacturing the device and occasionally also resulted in damage to the device.

Accordingly, it is an object of the present invention to provide a mold assembly which uses a resilient material in order to compensate for dimensional variations of a device being encapsulated.

Another object of the present invention is to use a resilient material to compensate for dimensional variations of the mold plates themselves.

Yet another object of the present invention is to provide a method of encapsulating a work piece in a manner to eliminate flash.

Yet a further object of the present invention is to provide a method for encapsulating a semiconductor device wherein a sheet of resilient material is used to seal a portion of the mold cavity.

SUMMARY OF THE INVENTION

The above and other objects and advantages of the present invention are achieved by the use of a sheet of resilient material located between a mold base and a cavity plate. The sheet of material, in one embodiment, seals an end of a cavity in the cavity plate and thereby compensates for any dimensional variations of the item being encapsulated. In another embodiment of the present invention the sheet of resilient material compensates for any variations in the cavity plate itself.

In a method of using the present invention, a sheet of resilient material is placed between the mold base and the mold or cavity plate. The items or work pieces to be encapsulated are placed in cavities provided by the cavity plate. The mold is closed and the sheet of resilient material compensates for any dimensional variations of the mold plates. In one embodiment, the sheet of resilient material also seals an end of a cavity formed by the cavity plate and thereby serves to compensate for any dimensional variations of the item being encapsulated.

BRIEF DESCRIPTION OF THE DRAWINGS

FIG. 1 illustrates a small portion of a closed mold assembly, in cross section, using the present invention;

FIG. 2 is a cross sectional view of an upper portion of a mold assembly using the present invention; and FIG. 3 is a cross sectional end view of a different type mold assembly using the present invention.

DETAILED DESCRIPTION OF THE DRAWINGS

FIG. 1 illustrates a mold assembly closed about two semiconductor devices commonly called button rectifiers. Button rectifiers 14 comprise a semiconductor device or diode 18 soldered between two heat sinks 16 and 17. Heat sinks 16 and 17 are circular in configuration and the top of heat sink 16 should be, but may not be, parallel with the bottom of heat sink 17. This creates a problem for the prior art button rectifier molds having a single face-to-face dimension to accommodate perfect face parallelism between the faces of heat sink 16 and the face of heat sink 17. In addition, there may also be height variations between semiconductor devices 14 themselves. The invention illustrated in FIG. 1 compensates for these variations. Upper cavity plate 12 mates with lower cavity plate 13 to form a cavity 19. Semiconductor devices 14 are placed in cavities 19. However, the faces or ends of semiconductor devices 14 must be free of encapsulating material so that devices 14 can later be soldered into a circuit where they will be used. An upper sheet of resilient material 10 is compressed against upper cavity plate 12 and forms a complete seal around the top portion of semiconductor device 14. This seal prevents any encapsulating material injected into cavity 19 from reaching the top portion of semiconductor device 14. In a like manner a sheet of resilient material 11 compressed against cavity plate 13 seals around the bottom portion of semiconductor device 14.

Typically, cavity plates 12 and 13 are metal plates machined to high tolerances. However, by using resilient sheets 10 and 11 the tolerances can be somewhat relaxed so that when the cavity plates 12 and 13 are closed around semiconductor device 14 they will not damage device 14 due to slight variations in alignment of devices 14 and cavity 19 or due to dimensional variations and parallelism of the ends of device 14. Therefore, the mold assembly illustrated in FIG. 1 locates semiconductor devices 14 and applies a controlled pressure to seal devices 14 during the encapsulating procedure. The pressure application to the end faces of semiconductor device 14 is a result of a clamping force of the molding press acting on thin sheets of high temperature rubber 10 and 11 which is installed between a mold base and cavity plates 12 and 13 as will be more apparent hereinafter. The mold assembly of the present invention will accept all of the semiconductor devices which have been successfully assembled and will enable molding such devices without damage. This mold assembly also eliminates flashing on the ends or faces of semiconductor devices 14 therefore no subsequent deflashing will be necessary.

FIG. 2 illustrates an upper portion of a mold assembly of the present invention in greater detail than that illustrated in FIG. 1. Semiconductor devices 14 are illustrated within cavities provided by cavity plate 12. The opposing cavity plate is not shown but will be identical to cavity plate 12 with the exception that the mold pot or mold chases (not shown) will be located in cavity plate 12. Semiconductor devices 14 are typically loaded into the bottom cavity plate (not shown) in the same manner as shown loaded into upper cavity plate 12. Semiconductor devices 14 are therefore stable on the lower face and located by the close fitting diameter near that face. Since the rubber sheet is not under pressure, the face contact area of semiconductor device 14 will be flat. When the mold assembly is closed (as illustrated in FIG. 1) the pressure clamping force brings the pressure on the faces of semiconductor devices 14 to that determined by the area of rubber sheet 10 divided into the closing force of the mold press. In this manner the rubber sheets act like a seal which seals at the close fitting diameters of the ends of semiconductor device 14 and applies the pressure to the end faces regardless of the face-to-face dimension variation and parallelism of the end faces. The resilient or rubber sheets should have a hardness reading on a durometer of approximately 30.

Cavity plate 12 is fastened through rubber sheet 10 by shoulder screws 24, which are distributed at uniform close spacing to hold cavity plate 12 in place and to counter act the ejection force applied by ejection pins 23. Rubber sheet 10 is dimensioned so that with mold base 22 at operating temperature it will just fill the volume between cavity plate 12 and mold base 22. The active area of chase or cavity plate 12 will be limited to 1,170 square centimeters. This gives about 162 kilograms per square centimeter of pressure on rubber sheet 10 for a 170 metric ton press. This is the limit of the end loading of semiconductor devices 14 regardless of the length or parallelism of the faces or ends of semiconductor devices 14. Once the end faces of semiconductor devices 14 are in contact with rubber sheet 10, adaptation to the variation in length or configuration will then be frictionless. Accordingly, the maximum force applied to semiconductor device 14 is therefore controllable and predictable. The same pressure will also be applied to the back side of cavity plate 12 wherein the total force is 162 kilograms per square centimeter times the plan area of cavity plate 12 less the area of the cavity openings themselves. The pressure acting on face 26 of cavity plate 12 is the force applied by rubber sheet 10 less the opening force exerted by the pressure of the encapsulating material on the area of cavity plate 12 which is normal to face 26 divided by the contact area between cavity plates 12 and 13. All interfaces between rubber sheet 10 and cavity plate 12 will be void of sharp edges to prevent fragmentation of rubber sheet 10 as it conforms to the contours of cavity plate 12 and semiconductor devices 14.

After the molding process is complete, that is after the central portions of semiconductor devices 14 which are located in cavity 19 are encapsulated, they are ejected from cavities 19 by action of ejector pins 23. Ejector pins 23 apply separating force to each semiconductor device 14 through rubber sheet 10. In a preferred embodiment, ejector pins 23 are about one half the diameter of the opening through which semiconductor device 14 makes contact to rubber sheet 10. An ejection stroke will cause ejector pin 23 to travel a distance equal to about one half of the thickness of rubber sheet 10.

In one embodiment, rubber sheet 10 is a sheet of silicone rubber having a hardness that allows adaptation to the backside of cavity plate 12 in semiconductor devices 14 without failure from excessive elongation or shear or distortion during ejection. Rubber sheet 10 can be a thickness from about 0.3 centimeters to 0.64 centimeters. This thickness should allow all of the shear flow to accommodate the variations in dimension and parallelism of semiconductor devices 14. This thickness may not be adequate to level the force distribution from all dimensional variations of the press and mold structure which must be leveled or compensated for by other means. For adequate heat transfer and to enable the ejection function rubber sheet 10 thickness is kept to a minimum.

Mold base 22 is pocketed or has a recess to contain rubber sheet 10 and a portion of cavity plate 12. The other portion of cavity plate 12 extends below mold base 22 to prevent mold base 22 from interfering with the closing of mold cavity plates 12 and 13. As a person skilled in the art will understand mold base 22 will have heaters and structural features typical of all such mold bases.

Flat head shoulder screw 24 is recessed in cavity plate 12 in order to maintain clearance with an opposing screw when the mold is closed and the cavity plates deflect to compress rubber sheet 10 as rubber sheet 10 conforms to the top surface of cavity plate 12 and semiconductor devices 14. Screw 24 also reacts to the force exerted by ejector pins 23 as ejector pins 23 distort rubber sheet 10 during the ejection of molded semiconductor devices 14. The number of screws 24 required will depend upon the thickness of cavity plate 12.

Ejector pins 23 are loosely fitted in mold base 22 and are void of sharp edges on the end that contacts rubber sheet 10. Ejector pins 23 are set flush with mold base 22 when the mold is closed.

During operation every mold cavity in cavity plate 12 should have a semiconductor device 14 in order to prevent damage to rubber sheet 10. Rubber sheet 10 will require more frequent replacement than would an all metal mold; however, the cost for such replacement is considerably less and production yields are much higher.

FIG. 3 illustrates the use of rubber sheets 30 and 31 in a mold assembly used for encapsulating molding axial leaded semiconductor devices. A semiconductor diode 34 has a first axial lead 36 soldered to one side and a second axial lead 37 soldered to an opposite side. This arrangement is placed in a cavity 39 formed by an upper cavity plate 32 and a lower cavity plate 33. FIG. 3 illustrates a cross sectional view of cavity plates 32 and 33 in a closed position. A plurality of cavities 39 are formed in a direction into the paper on which FIG. 3 appears. U.S. Pat. No. 3,685,784 which issued Aug. 22, 1972 to Spanger illustrates in greater detail a mold assembly for an axial leaded semiconductor device. This patent is hereby incorporated herein by reference.

Rubber sheets 30 and 31 are located on the backsides of cavity plates 32 and 33 respectively. Rubber sheets 30 and 31 compensate for any variation in the height differences of cavity plates 32 and 33. As an example, if the height of one side of cavity plate 32 or 33 is higher than the other side or if the cavity plate is not of a uniform height throughout its length then wire 36 or 37 extending through the closed cavity plates will become crimped and the mating surfaces of the cavity plates will tend to distort since they are relatively thin around cavity 39. This results in crimping of wires or leads 36 and 37 thereby making them difficult to remove from the mold cavity once they are encapsulated. Resilient or rubber sheets 30 and 31 will prevent this problem.

By now it should be appreciated that there has been provided a means and method of compensating for variations in cavity plates and or devices which are to be encapsulated within a mold assembly. A resilient material is used adjacent to the cavity plate in order to compensate for these variations. A molding press useful in molding semiconductor devices is shown in greater detail in U.S. Pat. No. 4,480,975 which issued on Nov. 6, 1984 to Plummer et al. This patent is hereby incorporated herein by reference.

I claim:

1. A mold assembly for encapsulating at least a portion of a work piece, comprising: a first mold base and a second mold base; a first cavity plate attached to the first mold base; a second cavity plate attached to the second mold base; a first sheet of rubber material positioned between the first mold base and the first cavity plate; and a second sheet of rubber material positioned between the second mold base and the second cavity plate, wherein the work piece fits in a cavity formed by the first and the second cavity plates and the first sheet of rubber seals a first end of the cavity and the second sheet of rubber seals a second end of the cavity so that when the at least a portion of the work piece is encapsulated the rubber seals prevent encapsulating material from reaching ends of the work piece.

2. The mold assembly of claim 1 further having an ejector pin held by the first mold base to eject the work piece by exerting pressure on the work piece through the first rubber sheet.

3. The mold assembly of claim 1 wherein the first and second rubber sheets are in the range of 0.3 cm to 0.64 cm thick.

4. The mold assembly of claim 1 wherein the first and second rubber sheets have a durometer reading of approximately 30.

5. A mold assembly for encapsulating a plurality of semiconductor devices, comprising: a mold base; a cavity plate having a plurality of cavities for accommodating the semiconductor devices; and a rubber sheet positioned between the mold base and the cavity plate to compensate for dimensional variations of the cavity plate.

6. The mold assembly of claim 5 wherein a portion of each semiconductor device extends outside of the cavity and the rubber sheet contacts the portion of the semiconductor device helping to seal at least one end of the cavity and also compensating for dimensional variations of the semiconductor devices.

* * * * *